Nov. 29, 1955  V. C. KENNEDY, JR  2,725,275
MULTIPLE RANGE PRINTING APPARATUS
Filed June 22, 1953  2 Sheets-Sheet 1
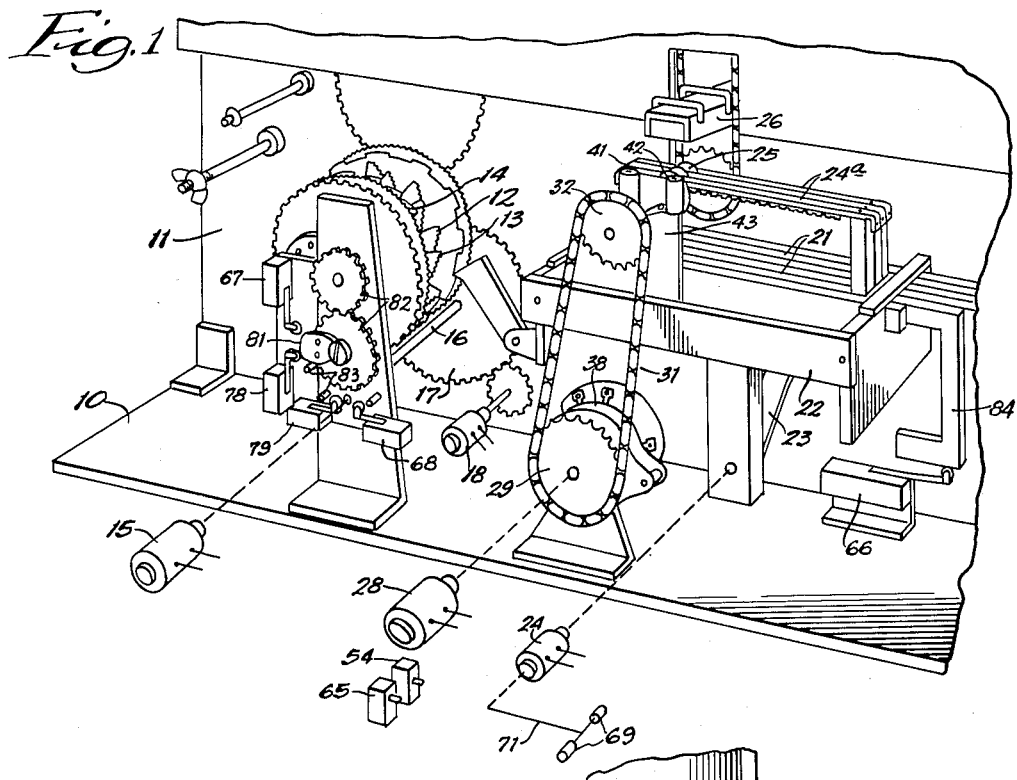
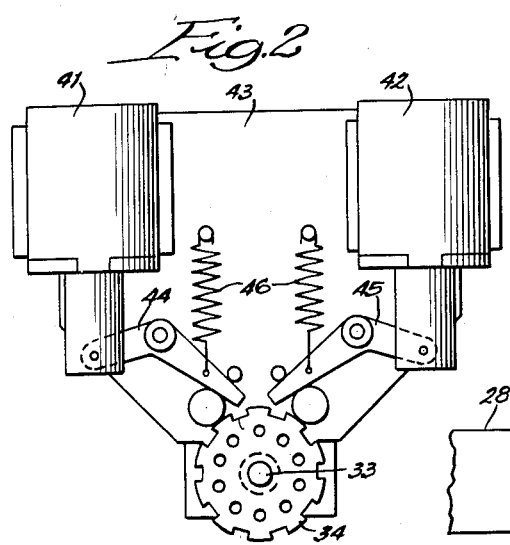
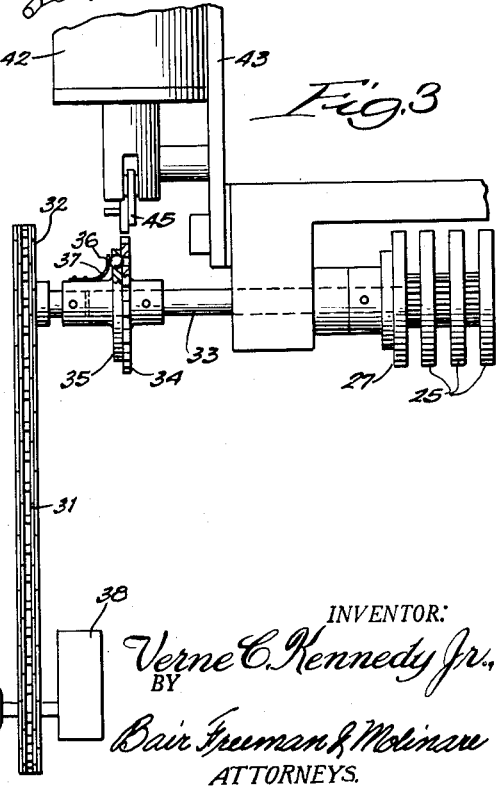
INVENTOR:
Verne C. Kennedy Jr.,
BY
Bair, Freeman & Molinare
ATTORNEYS.

Nov. 29, 1955 V. C. KENNEDY, JR 2,725,275
MULTIPLE RANGE PRINTING APPARATUS
Filed June 22, 1953 2 Sheets-Sheet 2
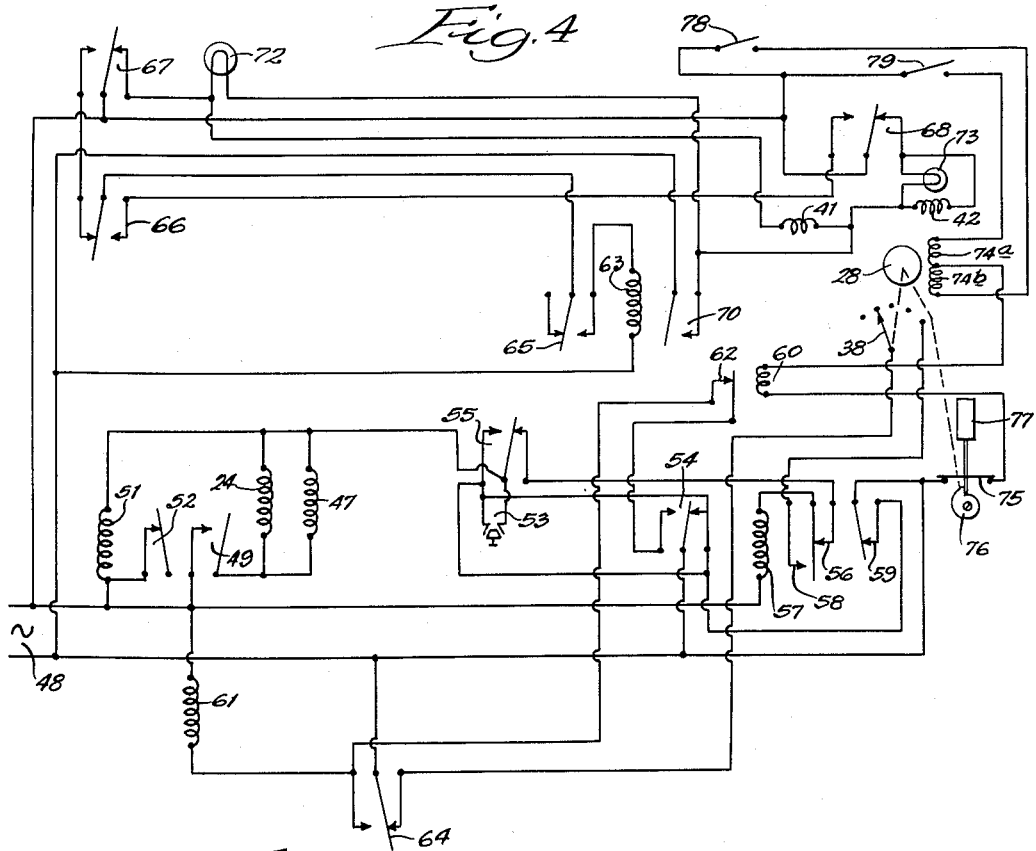
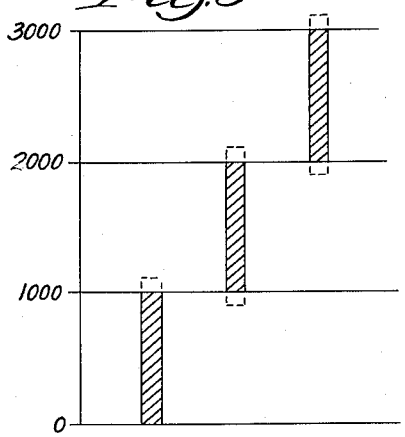
INVENTOR:
Verne C. Kennedy Jr.,
BY
Bair, Freeman & Molinare
ATTORNEYS.

United States Patent Office 2,725,275
Patented Nov. 29, 1955

2,725,275

MULTIPLE RANGE PRINTING APPARATUS

Verne C. Kennedy, Jr., Chicago, Ill., assignor to Streeter-Amet Company, Chicago, Ill., a corporation of Illinois Application June 22, 1953, Serial No. 363,027

12 Claims. (Cl. 346—9)

This invention relates to multiple range printing apparatus and more particularly to apparatus for printing the value of a condition such as the weight of a load through a plurality of different ranges of values.

Printing apparatus has heretofore been employed in connection with condition sensing means such as weighing apparatus to print values of the condition from time to time. In weighing, for example, it is customary to print the weight of each individual load placed on a weight responsive mechanism and in some cases to carry forward the totals of a plurality of loads.

In weighing apparatus, it is usually desirable to weigh loads varying through a predetermined normal range such as one thousand pounds and the printing apparatus is normally adjusted throughout such normal range. For loads falling outside the normal range, it has been proposed to employ range changing means in the load responsive mechanism to change the range of weights to which the mechanism will respond and also to provide a range changing element in the printing mechanism which is adjustable to correspond to the adjustment of the range changing means. An example of apparatus of this type is more particularly described and claimed in my co-pending application Serial No. 268,040, filed January 24, 1952.

There are many installations for weighing a series of loads where the majority of the loads fall in the same range and some few loads fall outside of the range by a relatively small amount. In such installations, it is highly desirable to avoid the necessity of adjusting the load responsive means to a new range and thereby delay the printing for weights which are only slightly beyond the range.

It is therefore one of the objects of the present invention to provide multiple range printing apparatus in which the printing means is temporarily adjusted to indicate correctly values slightly beyond the normal range of the apparatus without requiring adjustment of the load responsive means.

Another object is to provide a printing apparatus in which the printing means is temporarily adjusted for values in a metastable range slightly beyond the normal range and both the printing means and the load responsive means are adjusted for a new range when the values go beyond the metastable range.

According to one feature of the invention, the range change is effected by a motor controlled by the printing mechanism and a time delay is introduced into operation after the readjusting step to give the apparatus time to readjust itself.

A further object is to provide printing apparatus in which the range changing operations are controlled electrically.

The above and other objects and features of the invention will be more readily apparent from the following description when read in connection with the accompanying drawings in which Figure 1 is a partial perspective view with parts illustrated diagrammatically of an apparatus embodying the invention;

Figure 2 is a partial elevation of the temporary range adjusting mechanism;

Figure 3 is a partial side elevation of the printing means showing the temporary range adjusting mechanism;

Figure 4 is a wiring diagram; and

Figure 5 is a diagram illustrating the operation.

The apparatus, as shown in Figure 1, is substantially similar to that more particularly described and claimed in my co-pending application Serial No. 268,040.

As shown, this apparatus includes a base 10 supporting a vertical panel 11 and which may be mounted in or forming a part of a casing or frame containing the major portion of the apparatus. The apparatus includes a series of step cams including a units step cam 12, a tens step cam 13 and a hundreds step cam 14. The step cams are adapted to be driven in proper ratio to each other so that for any given value fed into the step cam mechanism, the several different step cams will expose steps corresponding to respective integers in the value.

As shown, the units step cam 12 has ten lobes, each of which is divided into ten steps and each of which encompasses the steps of units from 1 to 10. The units step cam will therefore turn through one-tenth of a revolution for each single step movement of the tens step cam 13. The tens step cam is also divided into ten lobes, each of which is divided into ten steps and the tens step cam is directly connected to the hundreds step cam 14 to turn therewith. The units step cam is geared to the tens and hundreds assembly through step-down gearing by means of which the tens and hundreds step cam assembly will be turned at one-tenth the speed of the units step cam.

The step cam assembly is driven by a condition responsive system including a servo-motor 15 connected through a countershaft 16 and a gear 17 to drive the units step cam. Through this means, and through mechanism as more particularly described and claimed in my co-pending application, the step cams will be turned to a position corresponding to the value of a condition to be measured. The motor 15 preferably also drives a potentiometer 18 which is adjusted by the motor to re-balance the motor control circuit thereby to insure that the position of the motor will correspond at all times to the value sensed by the responsive means employed, such as the load cells disclosed in my co-pending application.

The step cams are adapted to be engaged by feeler fingers 21 mounted for sliding movement on a frame 22, there being one feeler finger for each of the step cams. The feeler fingers are urged toward the step cams by springs, not shown, and are adapted to be moved away from the step cams by an arm 23 which is rotated by the finger motor 24.

Each of the feeler fingers 21 carries on its upper surface upwardly projecting arms which support elongated racks 24a. The racks mesh with gears connected respectively to units, tens and hundreds printing wheels 25 forming a part of the printing mechanism. The printing wheels will therefore be adjusted in accordance with movement of the fingers which is in turn proportional to the adjustment of the step cams so that the values exposed at the upper surfaces of the printing wheels will correspond to the weight or value of other conditions fed into the step cams by the responsive servo-motor 15. To effect a printing operation, a tape may be fed over the printing wheels and an anvil 26 may be moved down against the tape to print the characters exposed on the printing wheels on the tape.

With the apparatus, as so far described, the step cams can be adjusted throughout a range of one thousand pounds, for example, and will effect a corresponding adjustment of the units, tens and hundreds printing wheels. Assuming that the step cams are adjusted to a value within the range and it is desired to effect a printing operation, the finger motor may be started to move the arm 23 to the left and allow the feeler fingers to engage the step cams. Movement of the feeler fingers will move the racks and turn the printing wheels 25 to the proper value so that when the anvil 26 moves down the weight will be correctly printed. After completion of the printing, the finger motor will retract the feeler fingers to the position shown ready for another weighing operation.

The printing wheel assembly also includes an additional high order wheel 27 which in the mechanism shown would represent thousands and would constitute a range change element. The wheel 27 is adapted to be adjusted independently of the step cams through a range change motor 28. The range change motor, as shown, drives a sprocket 29 connected through a chain 31 to a sprocket 32. The sprocket 32 is connected through a yielding clutch to a shaft 33 which is in turn connected directly to the printing wheel 27.

The yielding clutch, as shown, comprises a ratchet disc 34 connected to the shaft 33 and a second disc 35 lying face to face against the disc 34 and connected to the sprocket 32. The ratchet disc 34 is provided with a series of spaced perforations therethrough, there being ten equally spaced perforations in the construction shown. The disc 35 is formed with a single perforation therethrough receiving a coupling ball 36 pressed into a registering one of the openings in the disc 34 by a spring 37. With this construction, the sprocket 32 is normally connected to the shaft 33 and the disc 27, but the ratchet disc 34 and the printing disc 27 can be adjusted independently of the ratchet 32 due to yielding of the coupling.

The motor 28 is also connected directly to a range change means for the load responsive mechanism. This range change means, as shown, comprises a switch 38 connected directly to the lower sprocket 28 and which will change the effective range of values the load responsive means will sense in the manner more particularly described in my co-pending application Serial No. 268,040. Thus, when the range change motor is operated, it will simultaneously adjust the printing means to shift the printing wheel 27 and the switch 38 to change the range of values which the load responsive system will sense.

According to the present invention, the range change printing wheel 27 is adapted to be adjusted temporarily independently of the range change motor and without affecting the load responsive system. For this purpose, a pair of solenoids 41 and 42 are mounted on a supporting plate 43 adjacent to the printing mechanism to turn the sprocket wheel 34 through one step. Each of the solenoids includes a movable core connected respectively to levers 44 and 45 which are normally urged by springs 46 to the position shown in Figure 2. When either of the solenoids is energized it will rock its lever in a direction to engage the ratchet disc 34 and turn it through one step to change the thousands value displayed by the printing wheel 27 one unit. As long as the solenoid remains energized, the printing wheel 27 will remain in its adjusted position, but as soon as the solenoid is de-energized, the spring 46 will return the lever 44 or 45 to its initial position. The lever 44 or 45 remains in engagement with the sprocket 34 until returned to its initial position and during its return movement it will turn the sprocket 34 back to the position it initially occupied.

Operation of the apparatus will be more clearly understood by reference to the wiring diagram of Figure 4. As indicated in this diagram, the finger motor, as illustrated, has a winding 24 which is energized to cause the motor to run and has an additional brake solenoid 47 which is energized simultaneously with the motor to disengage a brake thereon.

When the motor is de-energized, the brake is engaged by a spring to hold the motor stationary and to stop coasting thereof. The motor and brake are adapted to be connected to a source of power indicated at 48 through a normally open switch 49 which is closed when a relay winding 51 is energized. The relay winding may also open a normally closed switch 52 which is connected in circuit with the servo-motor 15 to prevent this motor from turning the step cams during a printing operation.

The relay 51 is connected through a starting switch 53 and through a normally closed contact on a double throw switch 54 to the supply 48. Thus, when the starting switch is closed, the relay 51 will be energized to interrupt the servo-motor 15 and to start the finger motor 24. The finger motor carries a cam which operates a holding switch 55 to complete a holding circuit parallel to the starting switch. The holding switch is a double throw switch whose normally closed contact is connected through a normally closed contact 56 of a relay switch with the relay winding 57.

Thus, when the starting switch is closed, the relay 57 will also be energized through its normally closed contact 56. When the relay 57 is energized, it closes a circuit with a contact 58 constituting a holding switch for the relay and thereafter breaks the contact 56. At the same time, the relay opens a normally closed switch 59 in a re-starting circuit for the finger motor. The relay contact 58 is connected in circuit through the range change switch 38 so that whenever the range change switch is moved, the relay circuit will be temporarily interrupted and the contacts will return to the position illustrated.

The printing mechanism is actuated to move the anvil 26 by a motor including a winding 61 which may be either a rotary motor or a solenoid. The printing motor 61 is connected in circuit through a normally closed switch 62 which is opened by a relay 60 when it is energized. When the printing motor is energized, it operates a double throw holding switch 64 which normally occupies the position shown and which is moved during initial operation of the printing mechanism to complete a holding circuit through the printing motor. In this way, the printing motor is insured of completing a printing operation each time it is energized and with the end of the printing operation it will release the switch 64 which then returns to the illustrated position.

A relay 63 is connected in circuit with a switch 65 which is in turn in circuit with a switch 66, as shown. The switch 65 and the switch 54 are adapted to be operated by rollers 69 on an arm 71 carried by the finger motor 24. When the finger motor has completed one-half of a cycle to move the lever 23 to the left and release the fingers, the rollers 69 will engage and move the switches 65 and 54. This will cause the finger motor to stop at the end of one-half cycle when the fingers are released to move into engagement with the step cams so that the fingers will not be moved during a printing operation. Upon completion of the printing operation, the finger motor will again be energized, as explained hereinafter to return the fingers to their initial starting position, as shown.

The switch 66 has its contacts connected to the normally open contact of switches 67 and 68 so that the relay 63 will be energized only under desired conditions of operation. In addition to opening the switch 62, the relay 63 closes a normally open switch 70 which is connected in circuit with signal lights 72 and 73 to energize them. The signal lights are connected to the normally closed contacts of the switches 67 and 68, as shown.

The solenoids 41 and 42 are connected in parallel with the signal lights 72 and 73, respectively, to be energized when the signal light circuits are energized.

The reversible motor 28 is provided with reversing windings 74a and 74b which when energized will cause the motor to turn in opposite directions. The windings have a common terminal connected in series with the relay 60 and through a normally closed switch 75 to one side of the source 48. The switch 75 is adapted to be opened by a cam 76 connected to the motor 28 so that when the motor has turned sufficiently to move the printing wheel 27 and the switch 38 through one step, the switch 75 will be temporarily open to stop the motor. Momentum of the motor will carry the cam 76 past its high point so that as soon as the motor stops, the switch 75 can again close.

A time delay is introduced to closing of the switch 75 so that the servomotor 15 will have time to effect a readjustment of the step cams before the motor 28 can again be energized. As shown in Figure 4, this time delay is provided by a dashpot 77 connected to the switch 75 which will allow the switch to open rapidly, but will delay its closing for a predetermined time interval.

The motor windings 74a and 74b are controlled by limit switches 78 and 79, respectively. As seen in Figure 1, the limit switches are mounted adjacent to the switches 67 and 68 and are adapted to be engaged by a cam member 81 turned through gear 82 which is connected to be driven by the tens and hundreds step cams. As the step cams turn, the cam 81 will turn and when the step cams approach the limit of the normal range in either direction, the cam 81 will engage and operate either switch 67 or switch 68. These switches will remain operating for an interval constituting a metastable range beyond the normal range whose amplitude is determined by the size of the cam 81. Upon further movement, the cam 81 will engage limit stops, shown as pins 83 and when in engagement with such stops, it will release either switch 67 or switch 68 and will engage and operate either switch 78 or switch 79, as the case may be.

The switch 66 is normally held in the position shown in Figure 4 by an arm 84 connected to the feeler finger for the hundreds step cam. When the feeler finger for the hundreds step cam moves to the left, as seen in Figure 1, to its extreme position it will disengage the switch 66 and allow it to move to its opposite position.

Operation of the present system is indicated diagrammatically in the graph of Figure 5. The apparatus has a series of normal ranges which are varied by adjustment of the switch 38 and the printing wheel 27 each of which in the example illustrated is assumed to be one thousand pounds. This represents a complete cycle of the printing wheels 25 from 0 to 999 as one range, from 1000 to 2000 as a second range and from 2000 to 3000 as a third range. Assuming that the switch 38 and the printing wheel 27 are set for the range from 1000 to 2000 and the weight to be indicated falls within this range, the mechanism is then within its normal operating range, as indicated by the shaded lines lying between 1000 and 2000.

If the weight to be indicated is more than two thousand pounds or less than one thousand pounds, by a relatively small amount corresponding to the metastable range established by the size of cam 81 and the position of the stops 83, the apparatus will fall within its metastable range indicated by the dotted lines extending beyond the solid shaded portions. In this case, when it is desired to print one or the other of the solenoids 41 or 42 will be energized to turn the printing wheel 27 through one step so that the correct value will be printed. Upon completion of the printing operation, the solenoid will be de-energized and the spring 46 will return the printing wheel to its initial position corresponding to the position of the motor 28 and the switch 38.

If the weight is more or less than the amount represented by the metastable range, which may be assumed to be one hundred pounds beyond the normal range in each direction, the cam 81 will engage one of the stops 83 and will actuate one of the limit switches 78 or 79. At the same time, the solenoid 41 or 42, which has been energized, will be de-energized so that the range change motor 28 can turn the switch 38 and the printing wheel 27 to establish a new range.

For a printing operation, with a load in the normal range, the starting switch 53 is temporarily closed. This will energize the relay 51 to close the switch 49 and start the finger motor 24. At the same time, the relay 57 will be energized after which it will open the contact 56 and close the contact 58. Under this condition the relay 57 remains energized through its holding contact 58, the range switch 38 and the normally closed contact of the switch 64.

As soon as the finger motor starts, it closes the holding switch 55 which will hold the relay 51 energized and will maintain the finger motor in operation. When the finger motor has completed one-half of its cycle so that the feeler fingers are in engagement with the step cams, one of the rollers 69 on the finger motor will throw the switch 54 to its left hand position, as illustrated in Figure 4. This completes a circuit through the printing motor 61 including the normally closed switch 62 and the left hand contact of the switch 54. When the printing motor is energized, it throws the switch 64 to complete the holding circuit for the printing motor and at the same time to interrupt the holding circuit for the relay 57. At this time, the relay 57 is de-energized so that the switch 59 again closes. The switch 59 completes a circuit through the relay 51 to restart the finger motor, it being noted that the holding switch 55 remains actuated by the finger motor regardless of the stopping thereof. This circuit can be traced through the relay 51, the holding switch 55 and the switch 59. The finger motor will therefore restart and during the remaining half of its cycle will retract the feeler fingers from the step cam mechanism. Upon completion of this operation, the holding switch 55 will be released to return to its normal position as shown in Figure 4 and de-energize the relay 51. At this time, the switch 49 will open to stop the finger motor and release the brake so that it can be applied by its spring.

If the apparatus is out of range, the cam 81 will operate one of the switches 67 or 68 to effect a temporary adjustment of the range change printing wheel 27 before the printing is effected. Assuming that the range is set for 0 to 1000 pounds and the actual load is 1025 pounds, which is within the metastable range, as soon as the load is applied, the servo-motor 15 will adjust the step cams to a position corresponding to 25, which is beyond the 1000 pound upper limit of the range. When the operator closes the starting switch 53, the feeler fingers will move into the step cams and the finger motor will turn the arm 71 until the roller 69 thereon shifts the switch 65. At this time, a circuit will be established through the relay 63 from one side of the source through switches 67 and 66 and 65 through the relay 63. This will close the switch 70 and will establish a circuit through the signal light 73 and the solenoid 42 to turn the range change printing wheel 27 upward one step so that it now indicates the range from 1000 to 2000. Therefore, when the printing operation is completed, a correct indication of the weight at the value of 1025 pounds will be printed. Upon completion of the printing operation, the solenoid 42 and signal light 73 will be de-energized and the range change printing wheel will be returned to its initial position by one of the springs 46.

Again assuming that the apparatus is set for the range from 0 to 1000 and a weight of 1250 pounds, which is in excess of the metastable range, is placed on the scale. Under these conditions, the servo-motor 15 will drive the step cams to a position against the lower stop pin 83 to close the limit switch 79. As soon as the limit switch 79 is closed, a circuit will be completed through the motor winding 74a from one side of the source.

Energizing of the relay 60 will open the switch 62 to prevent operation of the printing motor until the range has been properly adjusted. The motor 28 will run through one step to adjust the range switch 38 and the range change printing wheel 27 to the next higher range step. As soon as the range change switch 38 starts to move, it will temporarily interrupt the circuit to the relay 57 so that this relay will be de-energized and the finger motor will be re-energized through the switches 54 and 59 to return to its starting position.

Upon completion of the range change, the weight applied to the apparatus falls within its then normal range of 1000 to 2000 pounds so that the servo-motor 15 will re-adjust the step cams to the correct value of 1250 pounds upon which a normal printing operation may be effected.

If the applied weight is greater than one step beyond the setting of the apparatus, the limit switch 78 or 79 will remain closed and the servo-motor 15 will not re-adjust the step cams after completion of the first step of adjustment. Under these conditions, as soon as the range change motor 28 has completed one step of adjustment, the switch 75 will be opened and will remain open an interval of time sufficient to permit the servo-motor to operate. After this interval, the switch 75 will again close and if the limit switch is still closed, a further range adjustment step will be effected in the same manner. This operation will continue until the range change motor has adjusted the apparatus to a point where the applied load falls within the normal or the metastable range of the apparatus as then adjusted, upon which the servo-motor will turn the step cams to release the limit switch and to ready the apparatus for a printing operation.

While one embodiment of the invention has been shown and described herein, it will be understood that this is illustrative only and not to be taken as a definition of the scope of the invention, reference being had for this purpose to the appended claims.

What is claimed is:

1. Multiple range printing apparatus comprising printing means including a plurality of printing elements movable step by step to different printing positions, one of said elements corresponding to the highest order digit in a value to be printed, means responsive to values of a condition throughout a normal range equal to the range represented by adjustment of said one of the elements through one step and a metastable range beyond the normal range and connected to the printing means to adjust all except said one of the printing elements, and means operated by said last named means only when it is in the metastable range to move said one of the elements through one step.

2. Multiple range printing apparatus comprising printing means including a plurality of printing elements movable step by step to different printing positions, one of said elements corresponding to the highest order digit in a value to be printed, means responsive to values of a condition throughout a normal range equal to the range represented by adjustment of said one of the elements through one step and a metastable range beyond the normal range and connected to the printing means to adjust all except said one of the printing elements, means energized by said responsive means only when it is in the metastable range to move said one of the elements through one step, and means operative upon de-energization of the last named means to return said one of the elements to its initial position.

3. Multiple range printing apparatus comprising printing means including a plurality of printing elements movable step by step to different printing positions, one of said elements corresponding to the highest order digit in a value to be printed, means responsive to values of a condition throughout a normal range equal to the range represented by adjustment of said one of the elements through one step and a metastable range beyond the normal range and connected to the printing means to adjust all except said one of the printing elements, a range change motor, a yielding connection between the range change motor and said one of the elements, stop means to limit movement of the responsive means to the metastable range, control means operated by movement of the responsive means to the stop means to energize the range change motor thereby to move said one of the elements through one step, and means operated by the responsive means only when it is in the metastable range to move said one of the elements through one step independently of the range change motor, the yielding means yielding during movement of said one of the elements by the last named means whereby the range change motor is not moved.

4. Multiple range printing apparatus comprising printing means including a plurality of printing elements movable step by step to different printing positions, one of said elements corresponding to the highest order digit in a value to be printed, means responsive to values of a condition throughout a normal range equal to the range represented by adjustment of said one of the elements through one step and a metastable range beyond the normal range and connected to the printing means to adjust all except said one of the printing elements, a range change motor, a yielding connection between the range change motor and said one of the elements, stop means to limit movement of the responsive means to the metastable range, control means operated by movement of the responsive means to the stop means to energize the range change motor thereby to move said one of the elements through one step, means energized by the responsive means only when it is in the metastable range to move said one of the elements through one step independently of the range change motor, said last named means being de-energized when the responsive means is moved to the stop means, and means operative upon de-energization of the last named means to return said one of the elements to a position corresponding to the existing position of the range change motor.

5. Multiple range printing apparatus comprising printing means including a plurality of printing elements movable step by step to different printing positions, one of said elements corresponding to the highest order digit in a value to be printed, means responsive to values of a condition throughout a normal range equal to the range represented by adjustment of said one of the elements through one step and a metastable range beyond the normal range and connected to the printing means to adjust all except said one of the printing elements, a range change motor, a connection between the range change motor and said one of the elements, stop means to limit movement of the responsive means to the metastable range, control means operated by movement of the responsive means to the stop means to energize the range change motor thereby to move said one of the elements through one step, a control device operated by the range change motor to de-energize it after it has moved said one of the elements through one step, and time delay means connected to the control device to prevent re-energization of the range change motor for a predetermined time interval.

6. Multiple range printing apparatus comprising printing means including a plurality of printing elements movable step by step to different printing positions, one of said elements corresponding to the highest order digit in a value to be printed, means responsive to values of a condition throughout a normal range equal to the range represented by adjustment of said one of the elements through one step and a metastable range beyond the normal range and connected to the printing means to adjust all except said one of the printing elements, a range change motor, a yielding connection between the range change motor and said one of the elements, stop means to limit movement of the responsive means to the metastable range, control means operated by movement of the responsive means to the stop means to energize the range change motor thereby to move said one of the elements through one step, a control device operated by the range change motor to de-energize it after it has moved said one of the elements through one step, time delay means connected to the control device to prevent re-energization of the range change motor for a predetermined time interval, means energized by the responsive means only when it is in the metasable range to move said one of the elements through one step independently of the range change motor, said last named means being de-energized when the responsive means is moved to the stop means, and means operative upon de-energization of the last named means to return said one of the elements to a position corresponding to the existing position of the range change motor.

7. Multiple range printing apparatus comprising printing means, means responsive to values of a condition throughout a normal range equal to a complete cycle of the printing means and a metastable range beyond the normal range to set the printing means, a range change element in the printing means adjustable independently of the responsive means, electrical operating means for the printing means, a starting switch for the electrical operating means, electrical switches operated by the responsive means when it is in the metastable range, and electrical means controlled by the starting switch and the last named switches to shift the range change element through one step.

8. Multiple range printing apparatus comprising printing means, means responsive to values of a condition throughout a normal range equal to a complete cycle of the printing means and a metastable range beyond the normal range to set the printing means, a range change element in the printing means adjustable independently of the responsive means, a range change motor connected to the range change element, range change means for the responsive means connected to the range change motor, stops to limit movement of the printing means by the responsive means to the metastable range, switches operated by adjustment of the printing means to the stops to energize the range change motor to move the range change element and the range change means through one step, switches operated by the printing means when it is in the metastable range, electrical operating means for the printing means including a starting switch, and electrical means controlled by the starting switch and the last named switches to move the range change element through one step independently of the range change motor.

9. Multiple range printing apparatus comprising printing means, means responsive to values of a condition throughout a normal range equal to a complete cycle of the printing means and a metastable range beyond the normal range to set the printing means, a range change element in the printing means adjustable independently of the responsive means, a range change motor connected to the range change element, range change means for the responsive means connected to the range change motor, stops to limit movement of the printing means by the responsive means to the metastable range, switches operated by adjustment of the printing means to the stops to energize the range change motor to move the range change element and the range change means through one step, a switch opened by the range change motor to stop the range change motor upon completion of one step, time delay means to delay closing of the last named switch, electrical means to move the range change element only through one step, and switches operated by the printing means when it is in the metastable range to energize the last named electrical means.

10. Multiple range printing apparatus comprising printing means, means responsive to values of a condition throughout a normal range equal to a complete cycle of the printing means and a metastable range beyond the normal range to set the printing means, a range change element in the printing means adjustable independently of the responsive means, a range change motor connected to the range change element, range change means for the responsive means connected to the range change motor, stops to limit movement of the printing means by the responsive means to the metastable range, switches operated by adjustment of the printing means to the stops to energize the range change motor to move the range change element and the range change means through one step, a switch opened by the range change motor to stop the range change motor upon completion of one step, time delay means to delay closing of the last named switch, a pair of selectively operable electrical devices adapted when energized to shift the range change element only through one step, springs effective when the electrical devices are de-energized to return the range change element to a position corresponding to that of the range change motor, and switches selectively operated by the printing means when it is in the metastable range above or below the normal range selectively to energize the electrical devices.

11. Multiple range printing apparatus comprising printing means, means responsive to values of a condition throughout a predetermined range equal to at least a complete cycle of the printing means to set the printing means, a range change element in the printing means adjustable independently of the printing means, a range change motor connected to the range change element, range change means for the responsive means connected to the motor and adjustable to change the range of values to which the responsive means will respond, switches operated by the printing means at the ends of said predetermined range to energize the motor for operation in one direction or the other, means controlled by the motor after movement corresponding to adjustment of the range change element and the range change means through one step to de-energize the motor, and time delay means to make the last named means ineffective after a predetermined time interval whereby the motor can again be energized through the switches.

12. Multiple range printing apparatus comprising printing means, means responsive to values of a condition throughout a predetermined range equal to at least a complete cycle of the printing means to set the printing means, a range change element in the printing means adjustable independently of the printing means, a range change motor connected to the range change element, range change means for the responsive means connected to the motor and adjustable to change the range of values to which the responsive means will respond, switches operated by the printing means at the ends of said predetermined range to energize the motor for operation in one direction or the other, a normally closed switch in circuit with the motor opened by the motor after movement thereof corresponding to adjustment of the range change element and range change means through one step, and time delay means to delay closing of the last named switch for a predetermined time interval.

References Cited in the file of this patent
UNITED STATES PATENTS

| | | |
|---|---|---|
| 2,070,011 | Hadley et al. | Feb. 9, 1937 |
| 2,301,946 | Hahn | Nov. 17, 1942 |